(12) United States Patent
Vezina et al.

(10) Patent No.: US 11,314,756 B2
(45) Date of Patent: *Apr. 26, 2022

(54) MANAGEMENT AND COMPARISON OF DATA FROM MULTIPLE INFORMATION SOURCES

(71) Applicant: Advertising Production Resources, Inc., Denver, CO (US)

(72) Inventors: Holly Vezina, Denver, CO (US); Kathy Lynn Keith, Denver, CO (US)

(73) Assignee: Advertising Production Resources, Inc., Denver, CO (US)

( * ) Notice: Subject to any disclaimer, the term of this patent is extended or adjusted under 35 U.S.C. 154(b) by 82 days.

This patent is subject to a terminal disclaimer.

(21) Appl. No.: 16/265,866

(22) Filed: Feb. 1, 2019

(65) Prior Publication Data

US 2019/0243826 A1     Aug. 8, 2019

Related U.S. Application Data

(60) Provisional application No. 62/625,429, filed on Feb. 2, 2018.

(51) Int. Cl.
| | |
|---|---|
| *G06F 16/248* | (2019.01) |
| *G06F 16/2457* | (2019.01) |
| *G06F 16/28* | (2019.01) |
| *G06F 16/22* | (2019.01) |
| *G06F 16/9038* | (2019.01) |

(52) U.S. Cl.
CPC ........ *G06F 16/248* (2019.01); *G06F 16/2228* (2019.01); *G06F 16/24578* (2019.01); *G06F 16/285* (2019.01); *G06F 16/9038* (2019.01)

(58) Field of Classification Search
CPC .. G06F 16/248; G06F 16/285; G06F 16/2228; G06F 16/24578
See application file for complete search history.

(56) References Cited

U.S. PATENT DOCUMENTS

| | | | | |
|---|---|---|---|---|
| 6,301,574 | B1* | 10/2001 | Thomas | G06Q 10/06 |
| | | | | 705/26.3 |
| 7,627,550 | B1* | 12/2009 | Adams | G06F 16/24556 |
| 9,633,076 | B1* | 4/2017 | Morton | G06F 16/248 |

(Continued)

OTHER PUBLICATIONS

S. Deng, C. Wan and X. Liu, "Selection of Multimedia Data Source Based on User Feedback," 2011 Fifth International Conference on Management of e-Commerce and e-Government, Hubei, 2011, pp. 285-289, doi: 10.1109/ICMeCG.2011.21. (Year: 2011).*

*Primary Examiner* — James T Tsai (57) ABSTRACT

Systems, methods, and software described herein provide enhancements for managing and comparing data from multiple information sources. In one implementation, a method of operating a comparison service includes obtaining, from a plurality of data sources, data objects in a plurality of formats corresponding to an event, wherein the data objects each comprise data items for the event. The method further includes maintaining a data structure for the event, wherein the data structure relates data items of similar data type from the plurality of data sources. The method also provides identifying a user request for a summary of the event, generating an event summary based on the data structure, and providing the event summary to the requesting user.

16 Claims, 7 Drawing Sheets

(56) References Cited

U.S. PATENT DOCUMENTS

| | | | |
|---|---|---|---|
| 2003/0225683 A1* | 12/2003 | Hill | G06Q 40/04 |
| | | | 705/37 |
| 2004/0168115 A1* | 8/2004 | Bauernschmidt | G06F 40/14 |
| | | | 715/238 |
| 2006/0089948 A1* | 4/2006 | Picker | H04H 60/73 |
| 2010/0153293 A1* | 6/2010 | Fox | G06Q 10/00 |
| | | | 705/347 |
| 2011/0264625 A1* | 10/2011 | Samudrala | G06F 16/25 |
| | | | 707/624 |
| 2015/0149420 A1* | 5/2015 | Lee | G06F 16/2365 |
| | | | 707/690 |
| 2016/0171542 A1* | 6/2016 | Fanous | G06Q 30/0256 |
| | | | 705/14.54 |
| 2018/0357562 A1* | 12/2018 | Hofman | G06N 5/022 |

\* cited by examiner

FIGURE 2

| DATA STRUCTURE 400 | | EVENT 402 | | | EVENT 403 | | |
|---|---|---|---|---|---|---|---|
| | SORUCE A 410 | SOURCE B 411 | SOURCE C 412 | SORUCE A 410 | SOURCE C 412 | SOURCE D 413 |
| DATA TYPE 420 | DATA | DATA | DATA | DATA | DATA | DATA |
| DATA TYPE 421 | DATA | DATA | DATA | DATA | DATA | DATA |
| DATA TYPE 422 | DATA | DATA | DATA | DATA | DATA | DATA |
| DATA TYPE 423 | DATA | DATA | DATA | DATA | DATA | DATA |
| DATA TYPE 424 | DATA | | | | | |

| | | | VIEW SPEC | ESTIMATE BUILDER | EXPORT COMPARISON | Tom A ▾ |
|---|---|---|---|---|---|---|
| « BACK | | | | | | |
| All Bids ▾ | | Compare By | ALPHA (V.3) | BETA (v.3) | THETA (V.1) | |
| | | Industry TopSheet ▾ | $575,234 | $625,456 | $602,455 | |
| PRODUCTION (3) | | ☐ Generic/Integrated | | | | |
| ALPHA (V.3) $575,234 | MATCH: ❍ | | Budget: Variance (2%) Match: (Budget, Treatmt) | Budget: Variance +2.6% Match: (Budget, Treatmt) | Budget: Variance +1% Match: (Budget, Treatmt) | |
| BETA (v.3) $625,456 | MATCH: 75% | $/HR | $26,404 | $44,427 | $4,427 | |
| THETA (V.1) $602,455 | MATCH: 75% | Prep Labor | $61,175 | $77,409 | $77,409 | |
| | | Casting | $2,743 | $23,712 | $23,712 | |
| POST PRODUCTION (4) | | Wardrobe | $6,680 | $14,033 | $14,033 | |
| ZETA (V.2) $125,456 | MATCH: ❍ | Set Dressing | $51,195 | $96,900 | $96,900 | |
| | | Mark-up % | 26% | 23% | 25% | |
| OMEGA (V.2) $156,231 | MATCH: 80% | Production Cost | $186,728 | $315,471 | $192,987 | |
| | | % of avail % | 54% | 70% | 70% | |
| PHI (V.1) $172,000 | MATCH: 75% | Per Spot Price | $528,083 | $431,595 | $431,455 | |
| | | Total Estimate | $575,234 | $625,456 | $602,455 | |
| | | | AWARD ⇱ | AWARD ⇱ | AWARD ⇱ | |

Sidebar: Logo, Notifications, Awards, Calendar, Preferences, Team, Help

MANAGEMENT AND COMPARISON OF DATA FROM MULTIPLE INFORMATION SOURCES

RELATED APPLICATIONS

This application hereby claims the benefit of and priority to U.S. Provisional Patent Application No. 62/625,429, titled "MANAGEMENT AND COMPARISON OF DATA FROM MULTIPLE INFORMATION SOURCES," filed Feb. 2, 2018, and which is hereby incorporated by reference in its entirety.

BACKGROUND

Organizations and services often aggregate data from a multitude of sources to provide accurate information to a user of the organization or service. This data may include numerical values, text based information, or some other data that can be provided to the user. However, although organizations and services may require that information is obtained from various sources, managing the data as it received can be difficult and cumbersome. In particular, issues often arise when the data is obtained in various different formats, which causes difficulties in combining the data with information from other sources. Additionally, difficulties can arise in presenting the information to a user of the organization or service to permit the user to efficiently and effectively identify relevant information from the presentation.

OVERVIEW

Provided herein are enhancements for managing and comparing data from multiple information sources. In one implementation, a method of operating a comparison service to manage data from multiple information sources includes obtaining, from a plurality of data sources, data objects in a plurality of formats corresponding to an event, wherein the data objects each comprise data items for the event. The method also includes maintaining a common data structure for the event, wherein the data structure relates data items of similar data type from the plurality of data sources. The method further provides identifying a user request for a summary of the event, and in response to the user request, generating an event summary based on the common data structure, wherein the event summary compares data items of similar type from the plurality of data sources. The method also includes providing the event summary to the requesting user.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

DETAILED DESCRIPTION

Figure 1:
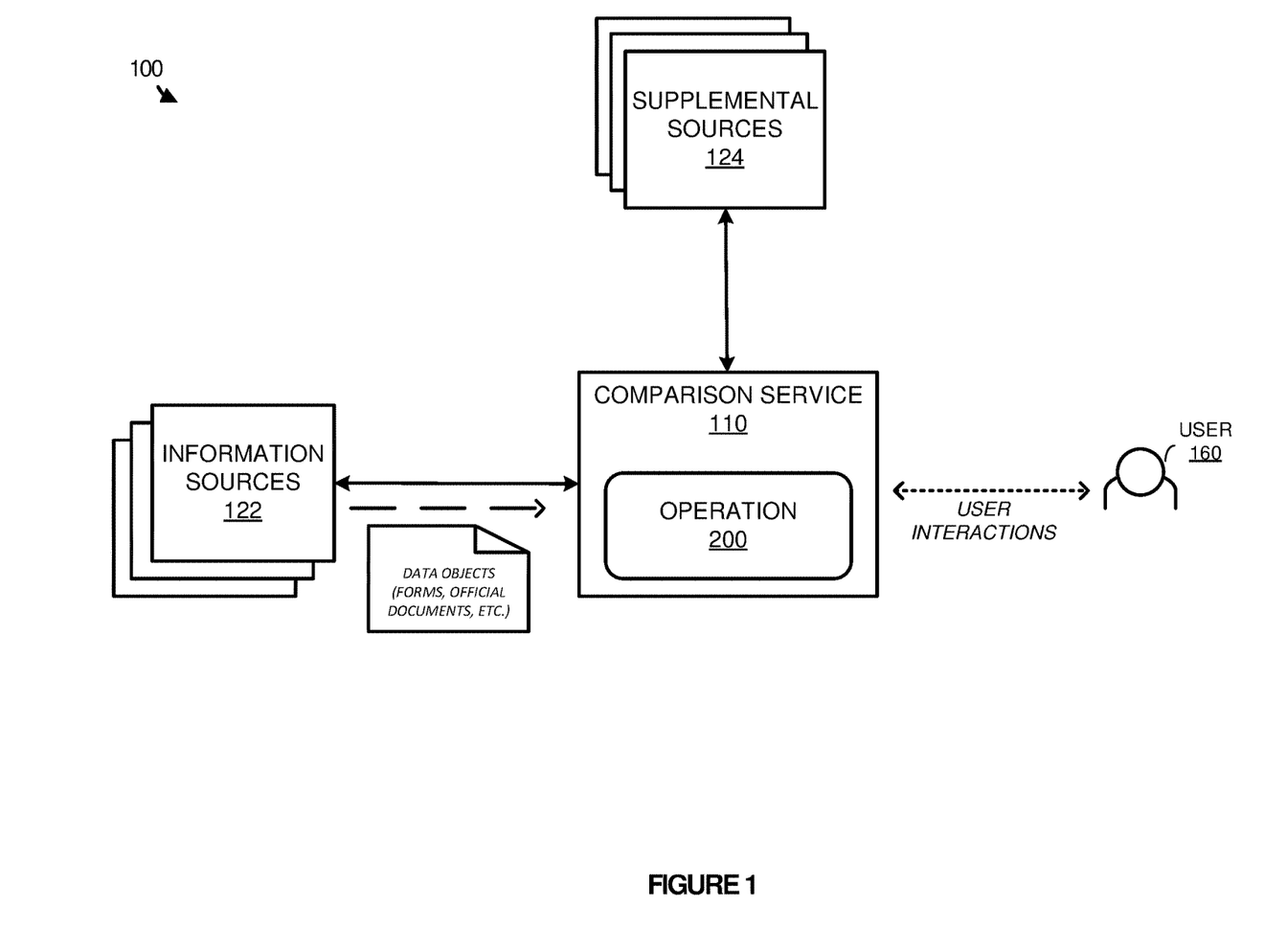
FIG. 1 illustrates a computing environment for managing and comparing data from multiple information sources according to an implementation.

FIG. 1 illustrates a computing environment 100 for managing and comparing data from multiple information sources according to an implementation. Computing environment 100 includes information sources 122, supplemental sources 124, comparison service 110, and user 160. Comparison service 110 is configured to provide operation 200 that is further described in FIG. 2.

As depicted, comparison service 110 communicates with information sources 122 and supplemental sources 124 to obtain data objects from the sources. These data objects may include forms, official documents, or some other similar data object. As the objects are obtained, either by information sources 122 automatically providing the information or via request from comparison service 110, comparison service 110 generates and maintains a data structure to cohesively manage the information from the various sources. In some implementations, the data objects that are received from information sources 122 and supplemental sources 124 may be provided using different format types. For example, a first information source may use a format type associated with a first geographic location (e.g. a first form), while a second information source may use a format type associated with a second geographic location (e.g. a second form). As a result, as the data objects are obtained, data items within the object (e.g. monetary values, ratings, scores, and the like) are extracted and placed within a common data structure capable of comparing information from multiple different formats. Thus, although a rating from a first information source may be in a first location for a data object, and a similar rating from a second information source may be in a second location, the common data structure may store the data in such a manner that the similar values can be compared.

As the data objects are obtained and the data items therein are placed within the common data structure, user 160 may generate requests to compare information between the different information sources. As an example, user 160 may provide a request for a particular event. In response to the request, comparison service 110 will identify data items that are relevant to the request and provide information to the user based on the identified data items, wherein the information permits the user to efficiently compare data items of similar data types across multiple information sources.

Figure 2:
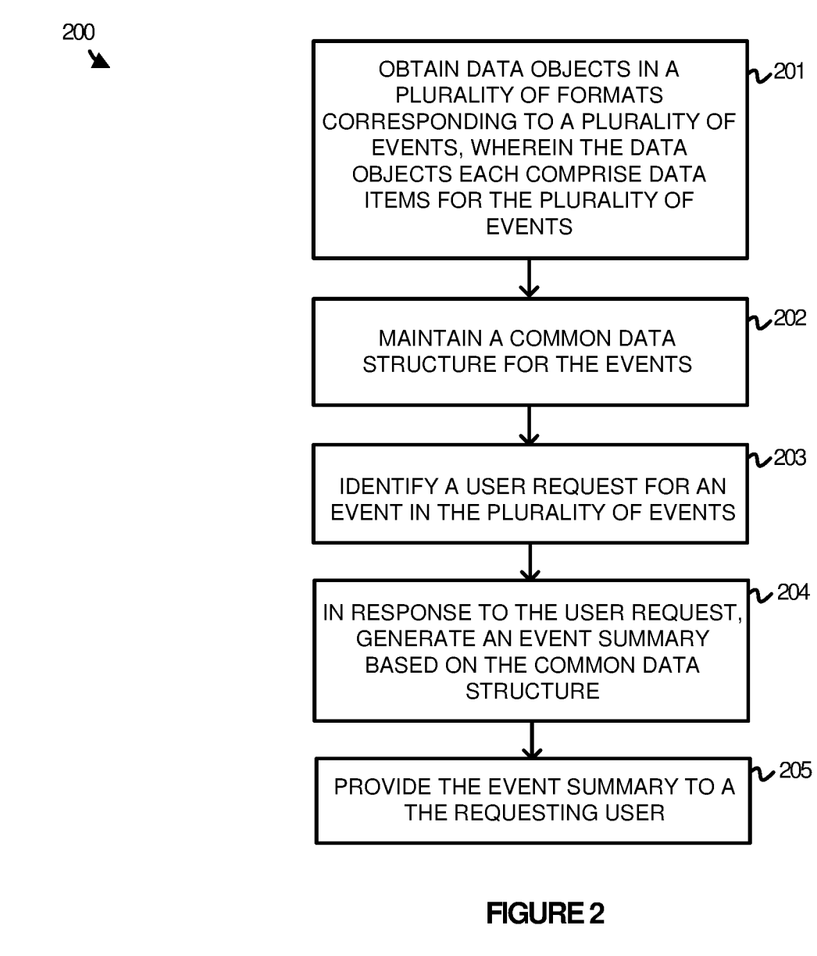
FIG. 2 illustrates an operation of a comparison service according to an implementation.

To further demonstrate operations of computing environment 100, FIG. 2 is provided. FIG. 2 illustrates an operation 200 of a comparison service according to an implementation. The processes of operation 200 are described parenthetically in the paragraphs that follow with reference to systems and elements of computing environment 100 of FIG. 1.

In the example of operation 200, comparison service 110 obtains (201) data objects in a plurality of formats corresponding to a plurality of events, wherein the data objects each comprise data items for the events. In some implementations, the data objects may comprise forms, documents, or other similar objects that contain various statistical data items for a particular event. These data objects may comprise varying formats based on the information source for the particular data object. In at least one implementation, based on the location of the information source (e.g. country, trade organization, and the like), the information source may use a particular format associated with the location. As a result, although two information sources may provide a data object with similar information, the format of the data objects may differ, creating difficulties in comparing similar data between the information sources.

Once the data objects are obtained from the information sources, operation 200 further maintains (202) a common data structure for the events. This common data structure is used to relate data items of similar type to other data items from other information sources. For example, comparison service 110 may receive three data objects from three different information sources, wherein the data objects may be provided in three different formats. Once the objects are received, each data item within the data objects may be extracted and associated with similar data items from the other data objects. Consequently, if a data item represented an amount of time for a particular operation related to an event, such as completing a project for the event, the data item may then be stored in the common data structure such that it may be related or compared to other times for the same operation related to the event.

While maintaining the common data structure for the events, operation 200 further includes identifying (203) a user request for a summary of an event in the plurality of events. In identifying this request, comparison service 110 may operate as a remote service, wherein users via remote consoles, such as desktop computing systems, laptop computing systems, tablets, smartphones, or some other similar console computing systems, may request comparison information for a particular event. As an example, comparison service 110 may be configured to take bids to provide services for a particular event and the information sources may comprise contractors capable of fulfilling the requirements for the event. As information is gathered from the contractors that may use various different formats, the information may be stored in a data structure permitting data items of a similar data type to be compared for the event. While the data is maintained within the structure, a user may request a summary comparison between each of the contractors providing a bid for the particular event.

Once a request is identified, operation 200 generates (204) an event summary based on the common data structure, and provides (205) the event summary to the requesting user. Returning to the example of requesting a bid for a particular event, comparison service may identify relevant data items from contractors related to the event, and generate a summary using the data items. In some implementations, the comparison may be used to compare each of the contractors that are providing bids for the particular event, wherein the requesting user may be provided with information about various data types and corresponding values for each of the contractors. Accordingly, although each of the contractors may provide information using different formats, the data may be presented in such a manner that similar data types may be compared.

In at least one implementation, in providing the summary to the requesting user, comparison service 110 may be used to promote particular data types for the comparison. These data types may be promoted based on data items for the types meeting defined criteria. For example, if the value were numerical and data items from different sources had a large discrepancy in their numerical value, then comparison service 110 may flag the data type as a type that should be promoted. Other examples, of promoting a particular type may include identifying when an information source has not provided a data item for a particular type, when values from one or more of the sources are higher/lower than a predicted value, or some other similar criteria for promoting a particular data type. In promoting the data type within the presentation to the requesting user, comparison service 110 may highlight one or more data items that correspond to the data type, may move the promoted data items into a better viewing position for the user (such as the top of the display), may bold or provide a different font for the promoted data items, or may provide the information in any other similar manner. By promoting particular data items for the requesting user, the user may more easily analyze and process the varying data types to determine differences between the information sources. Referring again to the example of the contractors (information sources) providing bids for a particular event, the user may analyze differences between the various contractors to identify a contractor capable of providing the required services.

As illustrated in computing environment 100, comparison service 110 may also use supplemental sources 124 in providing summary information about an event. In particular, supplemental sources 124 may not comprise direct forms or input related to an event, but may comprise alternative sources related to an event. In some implementations, these alternative sources may comprise emails, chats, or some other similar data source related to the information sources. For example, when an information source of information sources 122 lacks a data item or value for a particular data type, comparison service 110 may inspect supplemental sources 124 to determine if a value can be extracted. If an appropriate data item can be identified, in some examples by applying natural language operations on the information from supplemental sources, then data time may be added to the common data structure to provide additional information for an event. Additionally, supplemental sources 124 may provide information about other similar events, wherein the data for the other similar events may be compared against a current event. Referring again to the example of promoting particular data types, if the values from supplemental sources 124 differed greatly from the values for a particular event from information sources 122, then the data type may be promoted for that event.

Figure 3:
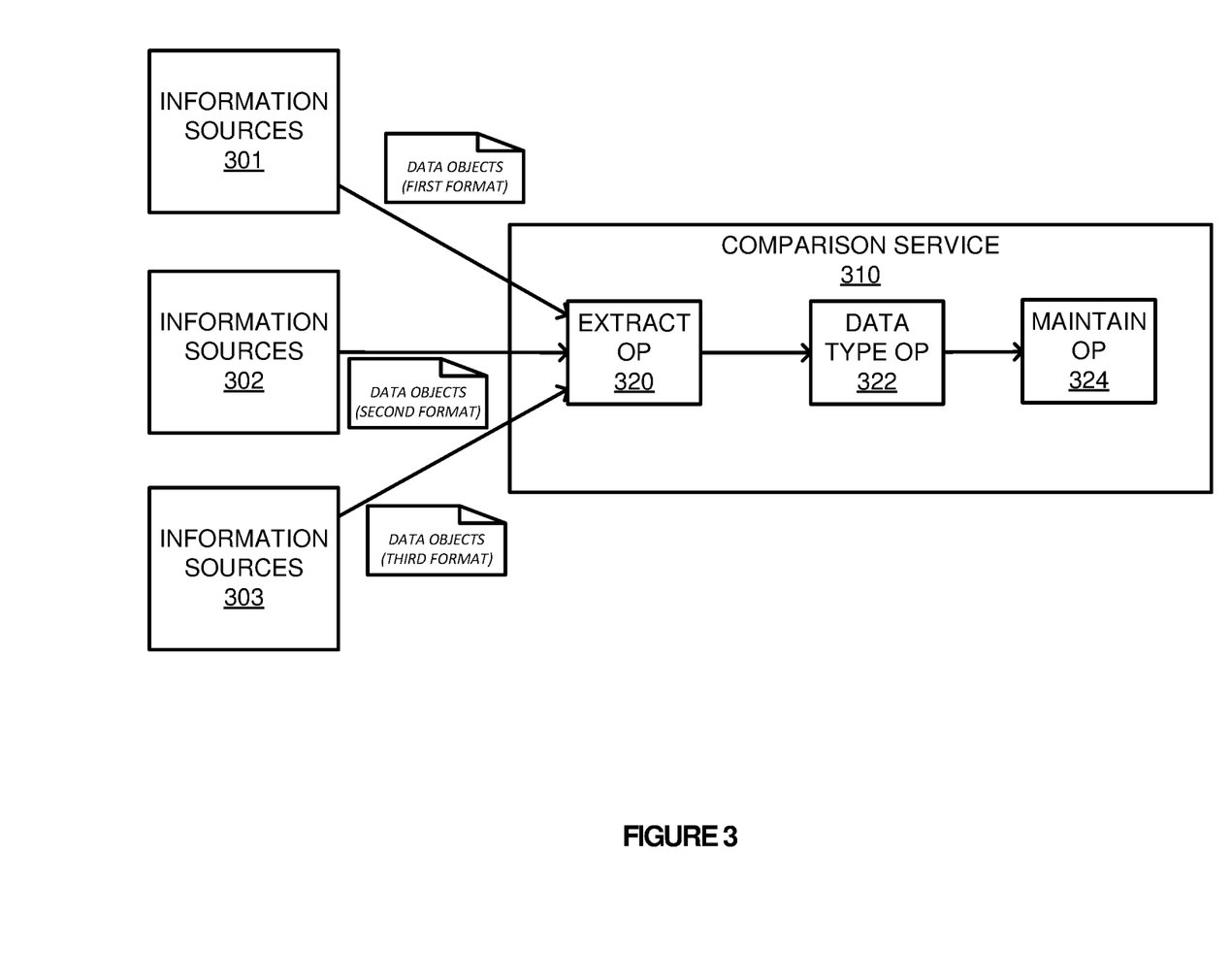
FIG. 3 illustrates an operational scenario of a comparison service according to an implementation.

FIG. 3 illustrates an operational scenario of a comparison service according to an implementation. The operational scenario in FIG. 3 includes information sources 301-303 and comparison service 310, wherein comparison service 310 further includes extract operation 320, data type operation 322, and maintain operation 324.

As described herein comparison service 310 may obtain data objects from a plurality of information sources 301-303, wherein the information sources may comprise contractors providing bids for one or more events, companies providing cost and capability information, or some other similar information sources, wherein the data from the sources may be compared via comparison service 310. In the present implementation, in providing the data objects to comparison service 310 the information sources may use multiple formats for the data objects, which causes difficulties in comparing data items/values from each of the information sources.

As a result of the differing formats, extract operation of comparison service 310 is used to identify the various data items within each of the data objects. In some implementations, in extracting the data, extract operation 320 may identify a format associated with a received data object, and based on the format, may identify the data items from the data object. For example, if a data object from information source 301 were in a first format with three numerical values, and a data object from information source 302 were in a second format with three numerical values, extract operation 320 may be used to extract the data values from both of the formats although the data may not be in the same order.

As the data is extracted using extract operation 320, data type operation 322 is used to identify the particular data type associated with each of the data items. These data items may include information about a particular event, such as total cost, total time, number of employees, or any other similar data type that might be consistent across each of the information sources. In some examples, to determine the data type, data type operation 322 may identify the format of the data object that was received and determine the different data types that are included in that format. Thus, if a format provided a number of employees first and then provided a total cost of providing services for an event, data type operation 322 may associate a first value extracted with an employee number data type, while type operation 322 may associated a second value extracted with a total cost data type.

Once a data type is identified for each of the data items, maintain module 324 is then used to maintain a data structure capable of comparing the data from each of the information sources. In this manner, for each event, data items of the same data type may be quickly identified for the information sources, such that they can be compared by a user interested in the event. For example, when a user requests a summary of a particular event, comparison service 310 may identify relevant data items associated with the particular event, and present a comparison of data items from different information sources to the requesting user. Referring again to the example of information sources providing a quantity of employees to support a particular event, comparison service 310 may provide a display to the requesting user permitting the user to compare quantities from each of the information sources. In this manner, rather than requiring each of the information sources to provide data using the same format, comparison service 310 may extract the relevant data and manage the data to be provided to requesting users.

As described herein, it should be understood that information sources 301-303 may provide multiple data object per event. In providing the data objects, comparison service 310 may be used to aggregate data items from each of the objects into singular data structure to be compared against the data obtained from other information sources. Further, in some examples, it should be understood that conflicts may be presented when multiple data objects are received for an event from a singular information source. For instance, if an information source provided multiple data objects that each included information about the number of employees required to support an event, then comparison service 310 may be responsible for managing the conflicts presented within the data objects. In managing the conflicts, the most recently identified data item may be promoted over other data items of the same data type, the most frequently encountered data item may be promoted over other data items of the same data type, or some other similar management process for conflicts.

Figure 4:
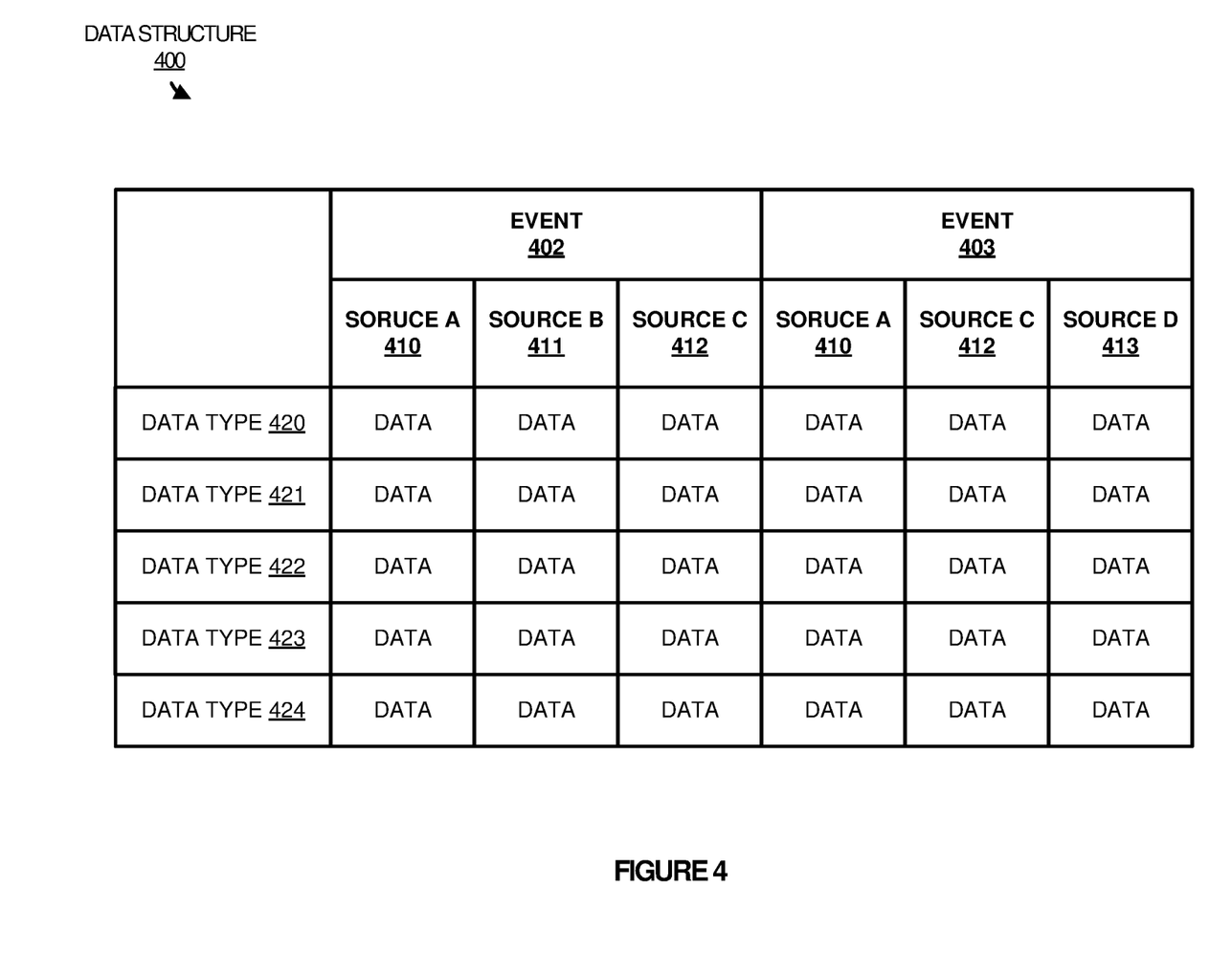
FIG. 4 illustrates a data structure for managing and comparing data from multiple information sources according to an implementation.

FIG. 4 illustrates a data structure 400 for managing and comparing data from multiple information sources according to an implementation. Data structure 400 includes events 402-403, data types 420-424, and sources 410-413. Although demonstrated with three sources per event, it should be understood that additional or fewer sources may provide data for data structure 400.

As described herein, a comparison service may communicate with one or more information to sources to obtain data objects related to events. These information sources may comprise contractors, companies, or some other similar information source in some examples. Additionally, the data objects may provide information related to costs, number of employees, locations, or some other similar information related to a particular event. As the data objects are received, the comparison service may extract data from the objects and use the data to populate data structure 400. In particular, because the data objects may be received in different formats, the comparison service may be required to extract data, identify a data type associated with each of the data items, and store the data in data structure 400, such that it can be compared to data from other information sources. Referring to an example for event 402, data for data type 422 may be stored in such a manner, such that it can be compared across sources 410-412. As a result, when a request is generated by a user of the service, data may be retrieved from data structure 400 and presented to the user, permitting the user to compare the information from the various sources.

Figure 5:
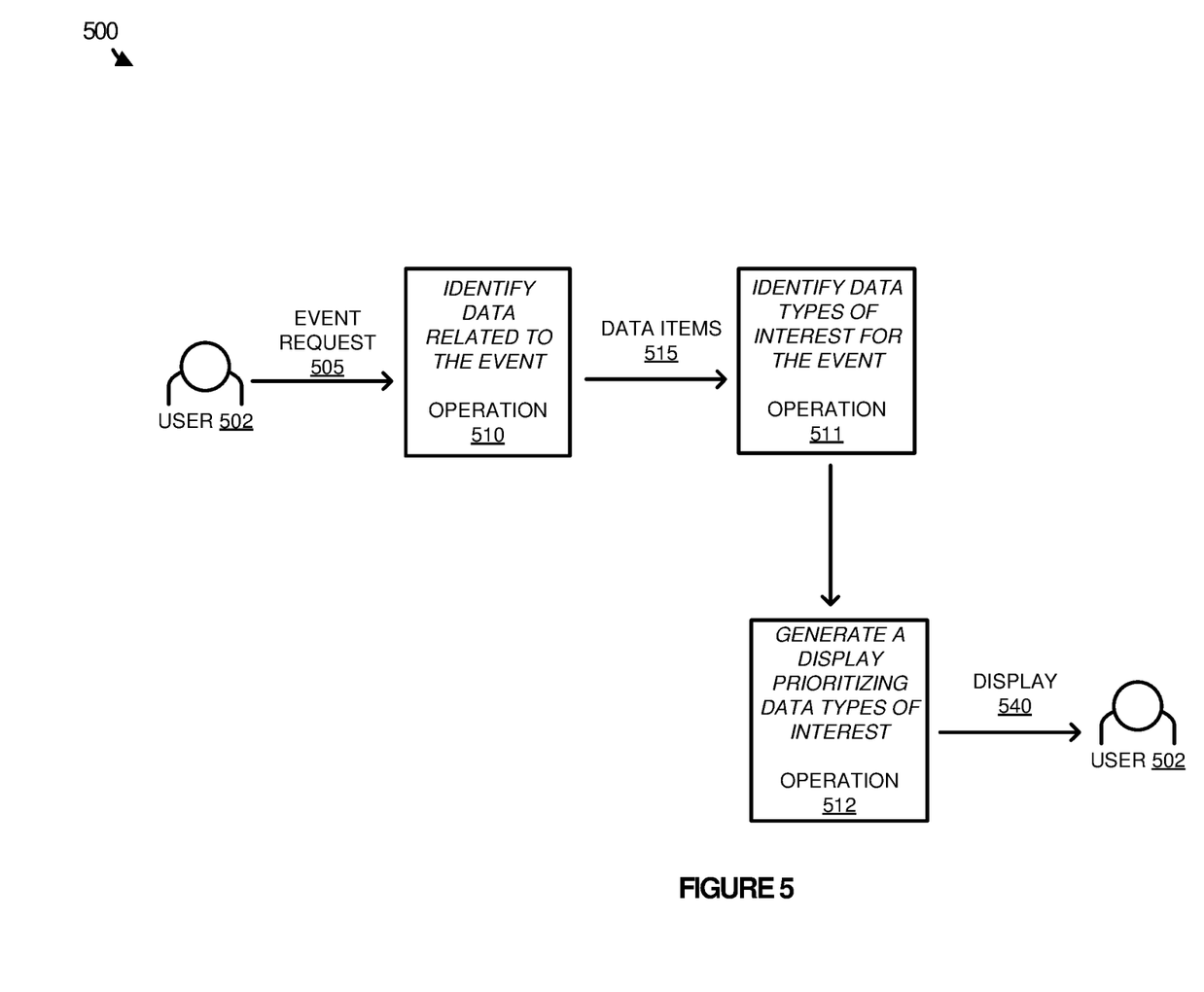
FIG. 5 illustrates an operational scenario for prioritizing data for a user of a comparison service according to an implementation.

FIG. 5 illustrates an operational scenario 500 for prioritizing data for a user of a comparison service according to an implementation. Operational scenario 500 includes operations 510-512 and user 502.

In operation, users of a comparison service provide requests to receive information about particular events. Specifically, the users may generate requests for data from multiple information sources, wherein the data from each of the sources may be compared with data from the other sources. In the present implementation, user 502 generates event request 505 that is identified by the comparison service. In response to the request, operation 510 is initiated that identifies data related to the event. Referring back to the data structure in FIG. 4, as data objects are received, data items within the objects are extracted and organized within a data structure, such that similar data items from multiple information sources may be compared to one another. In particular, when a user generates the request, the user may specify a particular event of a plurality of events for which a summary should be generated. As a result, data derived from information sources and data objects related to the event would be identified to support the request.

Once data items 515 are identified to support the request, operation 511 identifies data types of interest for the event. In identifying data types of interest, the comparison service may use various criteria, such as thresholds, to determine information that should be prioritized for the requesting user. In one implementation, the criteria may comprise differences in data values between the various information sources. For example, if four information sources were providing information about an event, and three had a similar value for a particular data type, while the fourth had a value that met criteria indicating a large deviation from the other values, the data type may be identified as one of interest for the user. In determining whether a value is too different from the others as to be flagged for a data type of interest, the comparison service may use percentages, set numerical values, or some other similar differencing criteria to identify when one or more values are not similar to other values. In another implementation, the criteria information for identifying data types of interest may be based on other similar events. In particular, when a user requests a particular event, the comparison service may identify similar events and data items that correspond to the event. As an example, if the event comprised a party and the information sources were contractors to support the party, then values from other similar parties may be compared with current values and the associated information sources. Thus, if one or more of the current information sources provided a value that is inconsistent with previous values, that value type may be flagged for the requesting user.

Although these are example criteria for identifying a data type of interest, it should be understood that other criteria may be used in identifying data types of interest. These criteria may be a minimum value (e.g. a minimum monetary value), a maximum value (e.g. a number of employees), or some other similar type of criteria.

After the data types of interest are identified, operation 512 generates a display prioritizing the data types of interest. In prioritizing the data types of interest over the other data types for the event, the types of interest may be highlighted, may be promoted to a particular location on the display, may be bolded or italicized, or any other similar operation of promoting a particular data type. In some implementations, users may interact with the comparison service via a remote console device, such as a laptop computer, desktop computer, smartphone, tablet computer, or some other similar computing system. To generate requests, the user may use a web browser or some other application on the computing system to generate requests that are received by the comparison system. Once the requests are received, the comparison system may employ operations 510-512 as described herein to provide a comparison summary to the requesting user.

Figure 6:
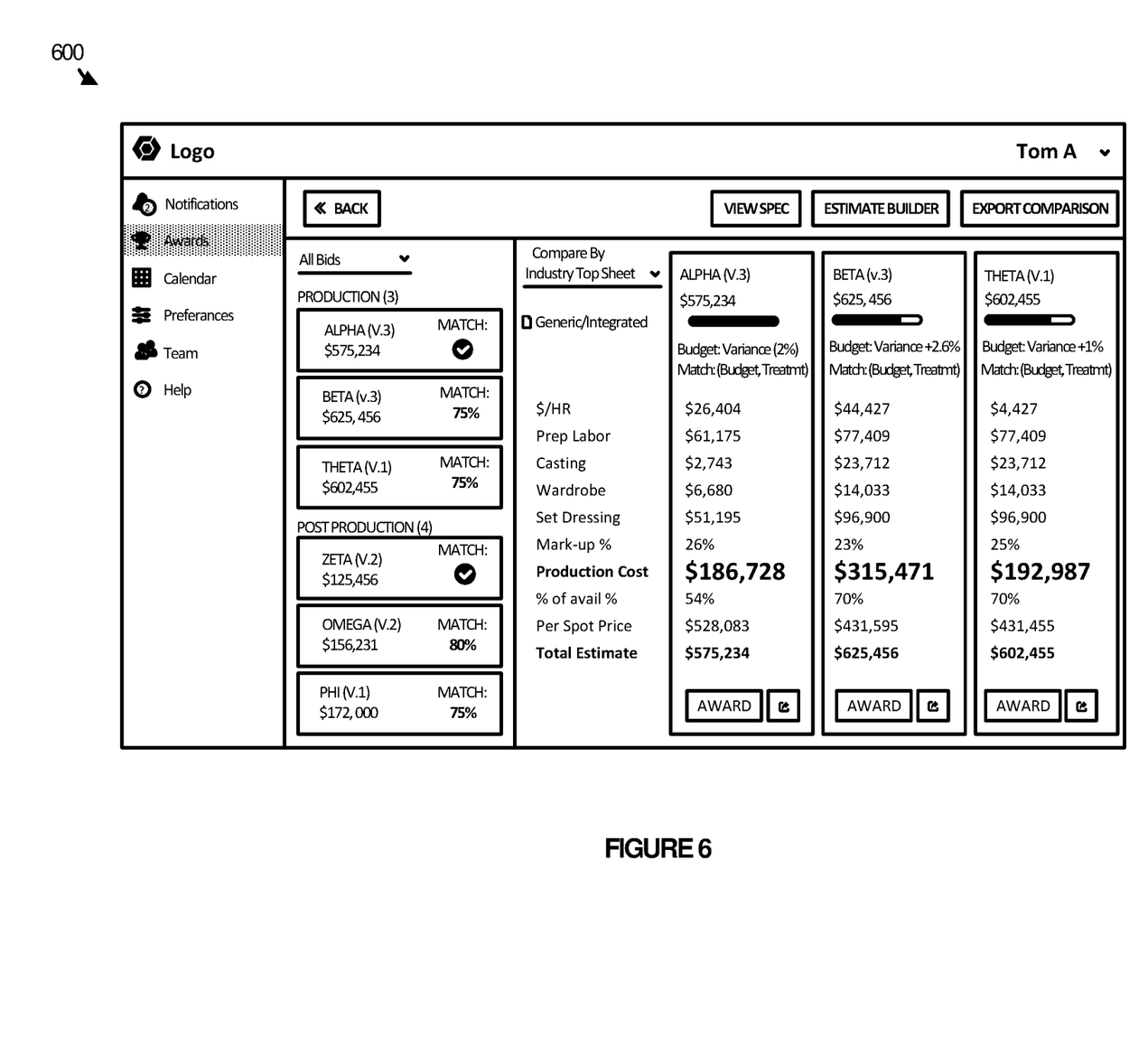
FIG. 6 illustrates a user interface for managing the comparison of data according to an implementation.

FIG. 6 illustrates a user interface 600 for managing the comparison of data according to an implementation. User interface 600 is an example summary that can be provided to a user in response to a request for a summary of a particular event. In the present implementation, the user interface includes comparison information for three different information sources. For each of the information sources, illustrated on user interface 600 as "ALPHA," "BETA," and "THETA," data is provided that corresponds to various data types. In particular, as a comparison service receives data objects from each of the information sources, the data items from the objects may be placed into at least one data structure capable of directly comparing similar data types. Thus, while each of "ALPHA," "BETA," and "THETA" may use different formats for their objects, the data within the objects may be directly compared.

In addition to identifying similar data types from the various formats and information sources, the comparison operation may further identify particular data types of interest when providing the information to a requesting user. To identify the data types of interest, in some implementations, the data items associated with the data types may be compared to defined criteria. The criteria may be used on comparing the data items themselves (such as the numerical values for a data type), may be used in comparing the current data items to data items of other similar event, may be used in comparing the current data items to user defined values for the data items of that data type, or may be used in any other similar manner.

Referring to the example in user interface 600, in providing the comparison information to the requesting user, the data type for "Production Cost" has been flagged as a data type of interest for the user. This data type may have been identified based on the cost for "ALPHA" being lower than the other information sources, may be based on one or more of the production costs being below a predefined threshold or lower than previously presented production costs, or may be identified in any similar manner. As a result of being identified, data items related to the production cost are provided in a different font than data items related to other data types, permitting the user to quickly identify and analyze the information for the data type to make decisions regarding the particular event.

Although demonstrated in the example of FIG. 6 as bolding and increasing the font size for the data type of interest, it should be understood that other operations may be employed to promote a data type of interest. These other operations may include placing the data item of interest in a location that is in a better location of the display to be acknowledged by the user, may be highlighted, provided in a different color font, or promoted for the user in any other similar manner.

Figure 7:
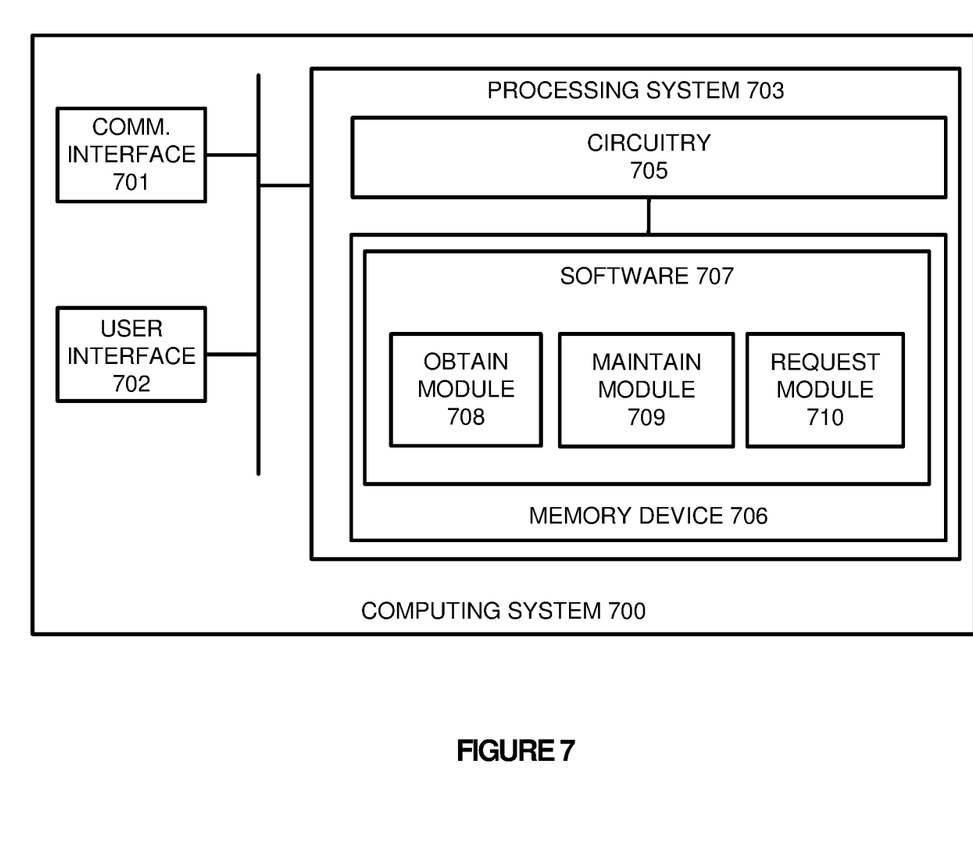
FIG. 7 illustrates a computing system to manage and compare data from multiple information sources according to an implementation.

FIG. 7 illustrates a computing system 700 manage and compare data from multiple information sources according to an implementation. Computing system 700 is representative of any computing system or systems with which the various operational architectures, processes, scenarios, and sequences disclosed herein for an event comparison service may be implemented. Computing system 700 is an example of comparison service 110 and 310, although other examples may exist. Computing system 700 comprises communication interface 701, user interface 702, and processing system 703. Processing system 703 is linked to communication interface 701 and user interface 702. Processing system 703 includes processing circuitry 705 and memory device 706 that stores operating software 707. Computing system 700 may include other well-known components such as a battery and enclosure that are not shown for clarity.

Communication interface 701 comprises components that communicate over communication links, such as network cards, ports, radio frequency (RF), processing circuitry and software, or some other communication devices. Communication interface 701 may be configured to communicate over metallic, wireless, or optical links. Communication interface 701 may be configured to use Time Division Multiplex (TDM), Internet Protocol (IP), Ethernet, optical networking, wireless protocols, communication signaling, or some other communication format—including combinations thereof. In some implementations, communication interface 701 may be configured to communicate with information sources to obtain data objects related to various events. Additionally, in some examples, communication interface 701 may be configured to communicate with one or more end user console systems to receive summary requests from end users and provide the users with generated summaries.

User interface 702 comprises components that interact with a user to receive user inputs and to present media and/or information. User interface 702 may include a speaker, microphone, buttons, lights, display screen, touch screen, touch pad, scroll wheel, communication port, or some other user input/output apparatus—including combinations thereof. User interface 702 may be omitted in some examples. In some implementations, user interface 702 may be used in obtaining user summary requests.

Processing circuitry 705 comprises microprocessor and other circuitry that retrieves and executes operating software 707 from memory device 706. Memory device 706 may include volatile and nonvolatile, removable and non-removable media implemented in any method or technology for storage of information, such as computer readable instructions, data structures, program modules, or other data. Memory device 706 may be implemented as a single storage device, but may also be implemented across multiple storage devices or sub-systems. Memory device 706 may comprise additional elements, such as a controller to read operating software 707. Examples of storage media include random access memory, read only memory, magnetic disks, optical disks, and flash memory, as well as any combination or variation thereof, or any other type of storage media. In some implementations, the storage media may be a non-transitory storage media. In some instances, at least a portion of the storage media may be transitory. It should be understood that in no case is the storage media a propagated signal.

Processing circuitry 705 is typically mounted on a circuit board that may also hold memory device 706 and portions of communication interface 701 and user interface 702. Operating software 707 comprises computer programs, firmware, or some other form of machine-readable program instructions. Operating software 707 includes obtain module 708, maintain module 709, and request module 710, although any number of software modules may provide the same operation. Operating software 707 may further include an operating system, utilities, drivers, network interfaces, applications, or some other type of software. When executed by processing circuitry 705, operating software 707 directs processing system 703 to operate computing system 700 as described herein.

In one implementation, obtain module 708 directs processing system 703 to obtain data objects from a plurality of information sources, wherein the data objects provide data related to a plurality of events. In some implementations, the information sources may comprise contractors, companies, or some other similar entity that is providing information, such as bids, cost estimates, or some other similar information for a particular event. These entities may use varying data object formats, which may comprise different forms, different formal documents, or some other format.

As a result of the differing formats, maintain module 709 directs processing system 703 to store data values from the data objects in a manner such that data items/values for the same event may be compared against other data values of the same data type. Thus, if a first value for wardrobe cost were provided from a first information source for an event, that first value may be stored in a manner that it can be compared to other values of the same type for the event. Once stored, request module 710 may direct processing system 703 to receive a request from an end user requesting comparison information for a particular event. In response to the request, request module 710 may identify data that corresponds to the event using the at least one data structure maintained by maintain module 709, and will provided the identified data to the requesting user. In some implementations, in providing the data to the requesting user, request module 710 may generate a display that permits the user to compare data types across multiple information sources.

As an example of providing information to a user that requests information about contractors for a party, each of the contractors (examples of information sources) may provide values corresponding to different data types for the party (e.g. number of personnel, cost of cake, cost of decorations, and the like). After the information is provided from the contractors and sorted into at least one data structure, the user may request a comparison summary for the party, wherein the summary may present values for each data type such that they can be compared across the contractors. Further, in some examples, at least a subset of the data types may be promoted over other data types based on criteria associated with the data type. The criteria may comprise criteria that compares that values for the data type (e.g. one data value may not closely reflect the other data items, or a data value may be missing from a particular source), the criteria may comprise criteria that relates values for the current event to values of other similar events (e.g. a value is much larger or smaller than values for another similar event), or may comprise some other criteria capable of being applied to an individual data type. In presenting the prioritized values, the identified data types may be highlighted, bolded, provided in a different font or size, promoted in the viewing space for the requesting user, or promoted in any other similar manner. Once presented, the user may be more capable of selecting an appropriate information source to support the event.

In some implementations, in addition to receiving the data objects, such as forms and official documents, from each of the information sources, computing system 700 may also obtain supplementary information from sources, such as email, instant messaging, and other similar sources. The information from these sources may be processed to identify relevant data items that can also be stored in the data structure from the primary information sources.

Returning to the elements of FIG. 1, information sources 122 and supplemental sources 124 may each comprise one or more computing systems (such as desktop computers, server computers, laptop computers, and the like) for a particular contractor, company, or some other similar information source. These computing systems may each comprise one or more communication interfaces and network interfaces, processing systems, computer systems, microprocessors, storage systems, storage media, or some other processing devices or software systems.

Comparison service 110 may comprise communication interfaces and network interfaces, processing systems, computer systems, microprocessors, storage systems, storage media, or some other processing devices or software systems, and can be distributed among multiple devices. Comparison service 110 may include software such as an operating system, logs, databases, utilities, drivers, networking software, and other software stored on a computer-readable medium. Comparison service 110 may comprise one or more serving computing systems, desktop computing systems, or some other similar computing system.

Communication between comparison service 110 and sources 122 and 124 may use metal, glass, optical, air, space, or some other material as the transport media. Communication between the host computing system and other computing nodes 130 may use various communication protocols, such as Time Division Multiplex (TDM), asynchronous transfer mode (ATM), Internet Protocol (IP), Ethernet, synchronous optical networking (SONET), hybrid fiber-coax (HFC), circuit-switched, communication signaling, wireless communications, or some other communication format, including combinations, improvements, or variations thereof. Communication between comparison service 110 and sources 122 and 124 may be a direct link or can include intermediate networks, systems, or devices, and can include a logical network link transported over multiple physical links.

The included descriptions and figures depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A method of operating a comparison service to manage data from multiple information sources comprising:
    obtaining data objects in a plurality of formats related to bids for an event by a plurality of data sources, wherein the plurality of data sources comprises a plurality of contractors, wherein the data objects each comprise one or more data items associated with the event that each correspond to a data type of a plurality of data types, wherein the plurality of formats comprises document formats and one or more email formats, and wherein the plurality of data types comprise at least costs associated with the event;
    maintaining a common data structure for the event, wherein the data structure relates data items of similar data type of the plurality of data types from the plurality of data sources;
    identifying a request for a summary of the bids for the event by the plurality of data sources;
    in response to the request:
        identifying one or more data types of interest from the plurality of data types based at least on data items for the one or more data types of interest satisfying one or more criteria, wherein identifying the one or more data types of interest comprises for a data type in the plurality of data types:
            determining that at least one data item that corresponds to the data type differs from one or more data items associated with one or more other events by a threshold amount; and
            in response to determining that at least one data item that corresponds to the data type differs from one or more data items associated with one or more other events by the threshold amount, classifying the data type as a data type of interest; and
        generating a display of the summary based on the common data structure, wherein the summary compares data items of the plurality of data types from the plurality of data sources, and wherein at least the data items for the one or more data types of interest are visually promoted using a different font, different size, different color, or different highlight than the one or more other data types in the summary over data items for one or more other data types from the plurality of data types not identified as a data type of interest.

2. The method of claim 1, wherein maintaining the common data structure comprises:
    for each data object, extracting one or more data items from the data object;
    identifying a data type of the plurality of data types associated with each of the one or more data items;
    storing each of the one or more data items in the common data structure based on the data type.

3. The method of claim 1, wherein identifying the request for the summary of the event comprises receiving the request from a console device.

4. The method of claim 1, wherein identifying the one or more data types of interest comprises for a data type in the plurality of data types:
    determining that a difference of two or more data items that correspond to the data type exceed a threshold value; and
    in response to determining that the two or more data items that correspond to the data type exceed the threshold value, classifying the data type as a data type of interest.

5. The method of claim 4, wherein the threshold value comprises a cost.

6. The method of claim 1, wherein the plurality of data types further comprise time for the event or personnel for the event.

7. An apparatus comprising:
    one or more non-transitory computer readable storage media;
    a processing system operatively coupled to the one or more non-transitory computer readable media; and
    program instructions stored on the one or more non-transitory computer readable media that, when read and executed by the processing system, direct the processing system to:
        obtain data objects in a plurality of formats related to bids for an event by a plurality of data sources, wherein the plurality of data sources comprises a plurality of contractors, wherein the data objects each comprise one or more data items associated with the event that each correspond to a data type of a plurality of data types, wherein the plurality of formats comprises document formats and one or more email formats, and wherein the plurality of data types comprise at least costs associated with the event;
        maintain a common data structure for the event, wherein the data structure relates data items of similar data type of the plurality of data types from the plurality of data sources;
        identify a request for a summary bids for the event by the plurality of data sources;
        in response to the request:
            identify one or more data types of interest from the plurality of data types based at least on data items for the one or more data types of interest satisfying one or more criteria, wherein identifying the one or more data types of interest comprises for a data type in the plurality of data types:
                determining that at least one data item that corresponds to the data type differs from one or more data items associated with one or more other events by a threshold amount; and
                in response to determining that at least one data item that corresponds to the data type differs from one or more data items associated with one or more other events by a threshold amount, classifying the data type as a data type of interest; and
            generate a display of the summary based on the common data structure, wherein the summary compares data items of the plurality of data types from the plurality of data sources, and wherein at least the data items for the one or more data types of interest are visually promoted using a different font, different size, different color, or different highlight than the one or more other data types in the summary over data items for one or more other data types from the plurality of data types not identified as a data type of interest.

8. The apparatus of claim 7, wherein maintaining the common data structure comprises:
for each data object, extracting one or more data items from the data object;
identifying a data type of the plurality of data types associated with each of the one or more data items;
storing each of the one or more data items in the common data structure based on the data type.

9. The apparatus of claim 7, wherein identifying the one or more data types of interest comprises for a data type in the plurality of data types:
determining that a difference of two or more data items that correspond to the data type exceed a threshold value; and
in response to determining that the two or more data items that correspond to the data type exceed the threshold value, classifying the data type as a data type of interest.

10. The apparatus of claim 9, wherein the threshold value comprises a cost.

11. The apparatus of claim 7, wherein identifying the request for the summary of the event comprises receiving the request from a console device.

12. The apparatus of claim 7, wherein the plurality of data types further comprise time for the event or personnel for the event.

13. One or more non-transitory computer readable storage media comprising:
program instructions that, when executed by a processing system, direct the processing system to:
obtain data objects in a plurality of formats related to bids for an event by a plurality of data sources, wherein the plurality of data sources comprises a plurality of contractors, wherein the data objects each comprise one or more data items associated with the event that each correspond to a data type of a plurality of data types, wherein the plurality of formats comprises document formats and one or more email formats, and wherein the plurality of data types comprise at least costs associated with the event;
maintain a data structure for the event, wherein the data structure classifies data items from the data objects into the plurality of data types, and wherein the data structure relates data items of similar data type from the plurality of data sources;
identify a request for a summary of the event;
identify one or more data types in the common data structure that satisfy one or more criteria to be classified as data types of interest, wherein identifying the one or more data types of interest comprises for a data type in the plurality of data types:
determining that at least one data item that corresponds to the data type differs from one or more data items associated with one or more other events by a threshold amount; and
in response to determining that at least one data item that corresponds to the data type differs from one or more data items associated with one or more other events by a threshold amount, classifying the data type as a data type of interest; and
in response to the request, generate a display of the summary based on the common data structure, wherein the summary compares data items of the plurality of data types from the plurality of data sources, and wherein at least the data items for the one or more data types of interest are visually promoted using a promoted location in summary, a different font, different size, different color, or different highlight than the one or more other data types in the summary over data items for one or more other data types from the plurality of data types not identified as a data type of interest.

14. The one or more non-transitory computer readable storage media of claim 13, wherein identifying the request for the summary of the event comprises receiving the request from a console device.

15. The one or more non-transitory computer readable storage media of claim 13, wherein the plurality of formats comprises one or more message formats.

16. The one or more non-transitory computer readable storage media of claim 13, wherein the plurality of data types further comprise time for the event or personnel for the event.

* * * * *